Dec. 18, 1951     J. CATALDO     2,579,363
OIL TEMPERATURE INDICATING DEVICE
Filed March 29, 1949
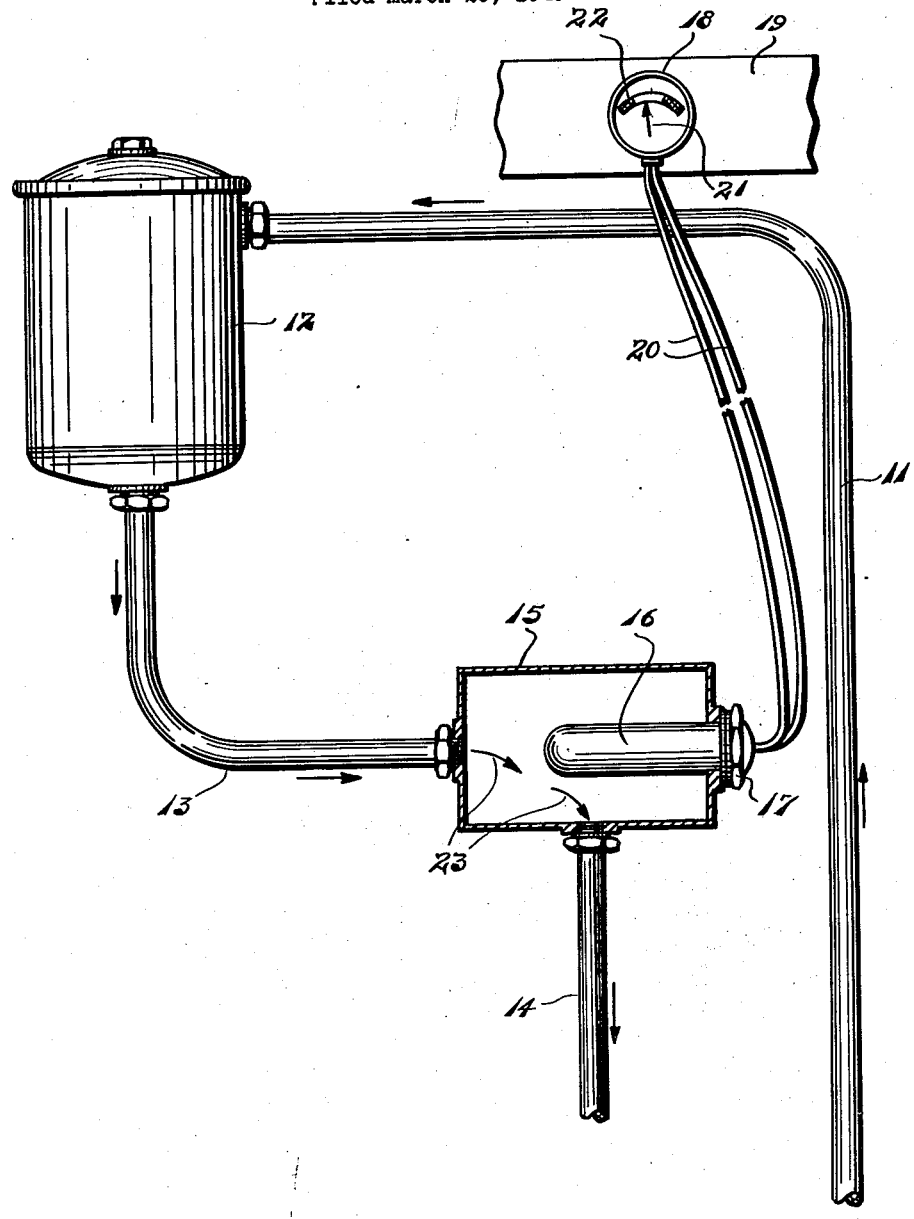
Inventor:
John Cataldo,
by Thomson & Thomson
Attorneys Patented Dec. 18, 1951

2,579,363

UNITED STATES PATENT OFFICE 2,579,363

OIL TEMPERATURE INDICATING DEVICE

John Cataldo, Revere, Mass.

Application March 29, 1949, Serial No. 84,211

2 Claims. (Cl. 73—349)

This invention relates to oil temperature indicating devices and pertains more particularly to means for indicating the temperature of the lubricating oil of the internal combustion engine of an automobile or other vehicle.

The principal purpose of the invention is to provide simple and economical apparatus for visually indicating to the operator of an automobile the temperature of the circulating oil in an engine lubricating system equipped with an oil filter. The use of this apparatus enables the operator to observe the temperature of the circulating oil and thus to know the general condition of the oil and the oil filter; the apparatus being so constructed and arranged that a decrease in the flow of oil resulting from a plugged filter reduces the indicated temperature and accordingly signifies that the filter should be cleaned. The operator is also warned of conditions which cause overheating of the circulating oil, so that the situation may be rectified before it becomes serious.

More specifically, it is an object of this invention to provide a closed chamber in the oil filtering line, between the oil filter and the inlet to the crank-case of the engine, the chamber having a heat-responsive element so disposed therein that the temperature of the element is affected by the rate of flow of oil as well as by the temperature of the oil; and to provide a visual indicator on the instrument panel of the vehicle, suitably connected to the heat-responsive element, so that the temperature of said element is visually indicated to the operator of the automobile.

A recommended embodiment of the invention is diagrammatically indicated in the drawing which shows the aforesaid chamber in section. It will be understood, however, that the structural details of the apparatus herein illustrated and described may be varied to suit particular purposes or conditions without departing from the essence of this invention as defined in the appended claims.

As shown in the drawing, the improved temperature indicating devices are associated with the oil circulating or filtering system of an internal combustion engine, comprising the supply pipe 11 leading to a conventional oil filter 12, and a return pipe including the pipe sections 13 and 14 leading to the crank-case of the engine. In accordance with this invention, a closed chamber 15 is disposed in the supply pipe between the pipe sections 13 and 14 which are suitably connected to the chamber by conventional couplings; a heat-responsive element 16 is mounted within the chamber by a suitable coupling 17; and an indicator 18 is mounted on the instrument panel 19 of the motor vehicle and connected to the element 16 by one or more flexible conduits 20.

It will be observed that pipe section 13 enters the chamber 15 at one side thereof and appreciably above its bottom, that the pipe section 14 is connected to the bottom of the chamber, and that the thermal responsive unit 16 is mounted horizontally in the opposite side of the chamber and disposed a substantial distance above the bottom thereof. Hence, when the oil is flowing through the filtering system at a normal rate, the chamber 15 will be filled with oil, so that the unit 16 is at the same temperature as the circulating oil; whereas, if the rate of oil circulation is substantially decreased, the oil will flow from the pipe section 13 to the pipe section 14 across the lower corner of the chamber, as indicated by the arrows 23 in the drawing, without immersing the bulb, so that the temperature of the element 16 which is not directly in the path of the flowing oil, is appreciably lower than the temperature of the oil.

The thermal responsive unit 16 comprises an immersion bulb of metal or other suitable material, preferably containing a volatile liquid such as ether. In such case, the conduit 20 between the element 16 and the indicator 18 consists of a capillary tube, and the indicator may be a conventional Bourdon guage. The heating of the bulb 16 by the circulating oil thus creates vapor pressure within the tubes 20 and actuates the Bourdon guage in a manner well understood. The guage may have a needle 21 and a dial 22 calibrated to the operating temperatures of the circulating oil. It will be apparent, however, that the indicator may comprise a light or sound signal, as an optional substitute for the dial and needle.

It is contemplated, however, that the bulb 16 may contain an electrical resistance wire responsive to the heat within the bulb and connected by one or more wires (in place of the tube 20) to an electrical indicator disposed on the dash and connected in the ignition circuit of the motor vehicle, as an obvious alternative for the fluid pressure bulb above described.

It will be apparent that the oil chamber 15 may be of any suitable size and shape and may be coupled to the oil filtering line at any convenient point, and that the flexible conduit 20 (either a vapor tube or an electric wire) may be led from the chamber to the indicator 18 on the instrument panel, in any convenient direction. The improved apparatus may be quickly and easily installed in either new or used automobiles or other vehicles operated by an internal combustion engine having a circulating system for filtering lubricating oil.

When so installed, the operator of the vehicle is enabled to observe the indicated oil temperature and thus be forewarned of any conditions in the oil supply system or the motor which affect the free circulation of the oil at a normal temperature. For example, if the normal temperature of the oil is assumed to be 140° F., an indicated temperature of 100° F. or below would inform the operator that the rate of oil flow through the chamber 15 had substantially decreased due to an obstruction or plug in the oil line such as might be caused by a clogged oil filter. This condition could then be promptly corrected by cleaning or replacing the oil filter, or by further examination of the lubricating system to determine why the supply line was obstructed. If the indicated temperature reaches 160° F. or above, the operator is warned that the oil in the system is overheated, and can have the condition promptly investigated to determine the cause of the trouble and make the necessary repairs or adjustments.

Heretofore, motor vehicles have been provided with no means for readily indicating the temperature or condition of the engine lubricating system, except the failure of the engine to operate properly, and the owner or operator is obliged to make periodic inspections of the oil filter to determine when it has become clogged and needs cleaning or replacement. The failure to make such inspections of the filter, or to notice that the lubricating oil is overheated, may result in serious damage to the engine, and the possibility of such damage is materially reduced, if not completely obviated, by the use of the temperature indicating apparatus herein described.

I claim:

1. Temperature indicating apparatus for the lubricating system of a motor vehicle having an oil-circulating pipe and an oil filter therein, comprising a closed chamber connected in said pipe between the oil filter and the crankcase of the engine, a thermal responsive element disposed in said chamber, a temperature indicator, and a conduit between the thermal responsive element and the indicator for actuating the indicator in response to the temperature of said element, said chamber being disposed between separated sections of said pipe, the pipe section leading from the oil filter being connected to the chamber at one side thereof and substantially above its bottom, the pipe section leading from the chamber being connected to its said bottom, and the thermal responsive element comprising an immersion bulb rigidly mounted in another side of the chamber, substantially above its bottom.

2. Temperature indicating apparatus for the lubricating system of a motor vehicle having an oil-circulating pipe and an oil filter therein, comprising a closed chamber connected in said pipe between the oil filter and the crank-case of the engine, a thermal responsive element disposed in said chamber, a visual temperature indicator, and a conduit between the thermal responsive element and the indicator for actuating the indicator in response to the temperature of said element, said chamber being disposed between separate sections of said pipe, the pipe section leading from the oil filter being connected to the chamber at one side thereof and substantially above its bottom, the pipe section leading from the chamber being connected to its said bottom, and the thermal responsive element comprising an immersion bulb rigidly mounted in another side of the chamber, substantially above its bottom, said bulb extending into the chamber in spaced relation to its bottom and terminating remote from the connection of the first named pipe section to the chamber side, whereby oil circulating through the said pipe at an abnormally low rate will flow through said chamber without immersing said bulb.

JOHN CATALDO.

REFERENCES CITED

The following references are of record in the file of this patent:

UNITED STATES PATENTS

| Number | Name | Date |
|---|---|---|
| 1,256,331 | Kopf | Feb. 12, 1918 |
| 1,663,600 | Jencick | Mar. 27, 1928 |